United States Patent [19]

Yamamoto et al.

[11] 4,194,229
[45] Mar. 18, 1980

[54] MODE SELECTING ASSEMBLY FOR RECORDING AND/OR REPRODUCING APPARATUS

[75] Inventors: Yoshinori Yamamoto, Tokyo; Hideo Imai; Yoshikazu Ishimatsu, both of Yokohama, all of Japan

[73] Assignee: Sony Corporation, Tokyo, Japan

[21] Appl. No.: 941,090

[22] Filed: Sep. 11, 1978

[30] Foreign Application Priority Data

Sep. 12, 1977 [JP] Japan .................. 52-109745

[51] Int. Cl.² ................................. G11B 19/00
[52] U.S. Cl. ............................. 360/137; 360/69
[58] Field of Search ............ 360/137, 61, 74.1, 69; 400/372; 242/201, 209, 186

[56] References Cited

U.S. PATENT DOCUMENTS

| | | | |
|---|---|---|---|
| 2,315,744 | 4/1943 | Smathers | 400/372 |
| 3,305,187 | 2/1967 | Atsumi | 360/137 |
| 3,900,173 | 8/1975 | Ketzer | 242/201 |
| 3,976,263 | 8/1976 | Suzuki | 242/209 X |
| 4,030,134 | 6/1977 | Ban | 360/137 |

FOREIGN PATENT DOCUMENTS

| | | | |
|---|---|---|---|
| 2535814 | 3/1976 | Fed. Rep. of Germany | 360/137 |
| 2257126 | 9/1975 | France | 360/137 |
| 1439673 | 6/1976 | United Kingdom | 360/137 |
| 433344 | 5/1972 | U.S.S.R. | 360/137 |

*Primary Examiner*—John H. Wolff
*Attorney, Agent, or Firm*—Lewis H. Eslinger; Alvin Sinderbrand

[57] ABSTRACT

A mode selecting assembly for a recording and/or reproducing apparatus includes at least one operating member, which is displaced to change the apparatus over to an operating mode. The operating member is displaced by the revolution of an operating gear having a toothless portion and the operating gear is driven by a pinion. The engagement of the operating gear with the pinion is triggered by a trigger member responsive to the depression of a corresponding operating push button. The operating gear is prevented from further rotation after the establishment of the selected operating mode by a locking member when the selected operating push-button is continuously depressed. The mode selecting assembly further includes timed recording capability wherein the pinion in engagement with the end of the toothed portion of the operating gear maintains the trigger means in an inactive state to place the apparatus in a preparing mode for timed recording. At the preset time, the preparing mode is released by a releasing member and the operating gear is rotated to its original inoperative position where the toothless portion faces the pinion to disengage the operating gear from the pinion.

18 Claims, 18 Drawing Figures

MODE SELECTING ASSEMBLY FOR RECORDING AND/OR REPRODUCING APPARATUS

BACKGROUND OF THE INVENTION

1. Field of the Invention

This invention relates generally to a mode selecting assembly for recording and/or reproducing apparatus, and more particularly is directed to a feather touch mode selecting assembly for a tape recorder.

2. Description of the Prior Art

The conventional tape recorder has a mode selecting assembly wherein the tape recorder is changed over to an operating mode by a depressible push button on which a force is impressed by the operator. That is, the mode selecting assembly is driven by the force imparted by a finger of the operator. In such mode selecting assemblies the operating push button requires a considerable force and the assembly is often difficult to operate. Another conventional tape recorder has plural plungers corresponding to each of the operating push buttons and the mode selecting assembly is changed over by the force of the respective plunger. This arrangement makes the tape recorder expensive and overly large.

OBJECTS AND SUMMARY OF THE INVENTION

One object of this invention is to provide a mode selecting assembly to improve the function and operability of a recording and/or reproducing apparatus.

Another object of this invention is to provide a mode selecting assembly for a tape recording and/or reproducing apparatus of the feather touch mode selecting type which is of an improved type over those available in the prior art.

A further object of this invention is to provide a mode selecting assembly for a recording and/or reproducing apparatus wherein the mode selecting assembly is prevented from further operation after the establishment of an operating mode.

A still further object of this invention is to provide a mode selecting assembly for a recording and/or reproducing apparatus wherein a preparing mode for timed recording is provided to allow the apparatus to automatically go into a recording mode at a preset time.

A still further object of this invention is to provide a mode selecting assembly for a recording and/or reproducing assembly wherein the preparing mode for timed recording is released mechanically at the preset time.

In accordance with an aspect of this invention, there is provided a mode selecting assembly for a recording and/or reproducing apparatus having a plurality of operating members for changing over the apparatus to a selected operating mode in accordance with the displacement of the operating member from a first inactive position to a second active position responsive to the selected depression of a mode selecting push button, an operating gear associated with each operating member being a toothless portion for displacing the respective operating member to its active position upon rotation of the gear, a pinion associated with each operating gear for driving the operating gear with the pinion being disengaged from its operating gear when the toothless portion of the operating gear is rotated to face the pinion, a trigger member associated with each operating push button to trigger the engagement of the respective operating gear with its pinion responsive to the depression of the respective operating push button and a stop member for preventing the operating gear from further rotating after the selected operating mode has been established with the stop member being actuated responsive to continued depression of the selected operating push button.

The above, and other objects, features and advantages of this invention will be apparent from the following detailed description of illustrative embodiments thereof which is to be read in connection with the accompanying drawings.

DESCRIPTION OF THE PREFERRED EMBODIMENTS

Figure 1:
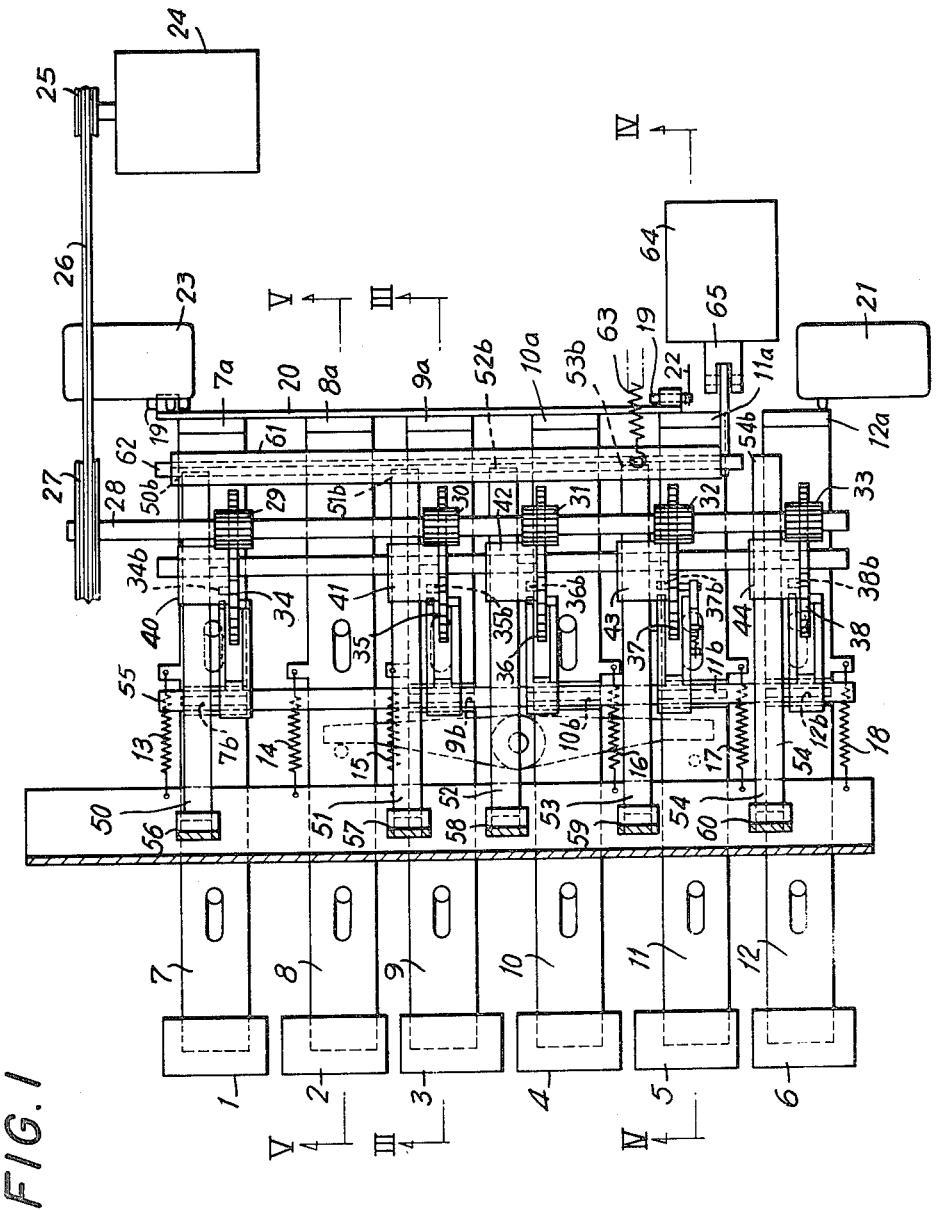
FIG. 1 is a plan view of a mode selecting assembly for a tape recording and/or reproducing apparatus according to a first embodiment of this invention.
Figure 2:
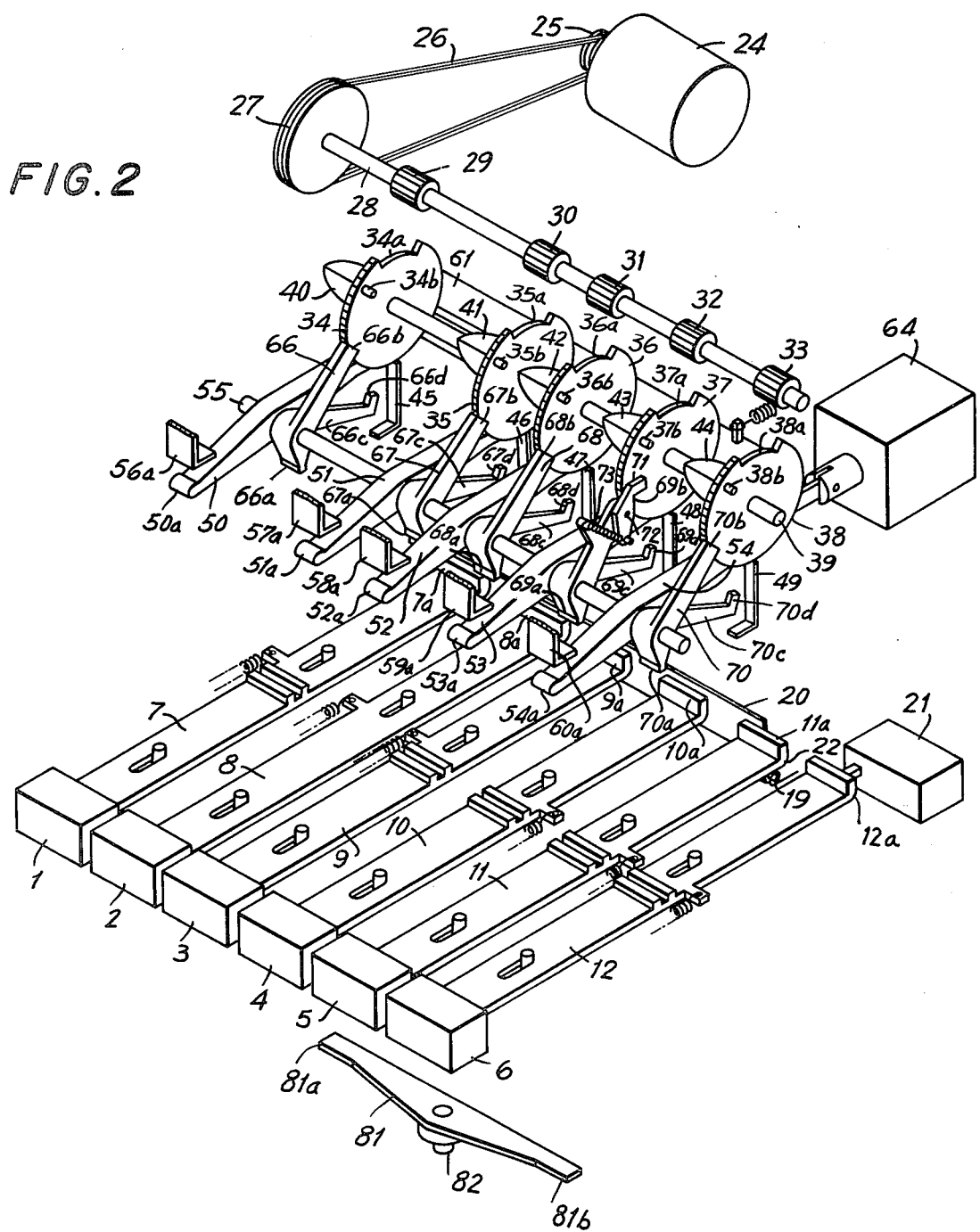
FIG. 2 is an exploded perspective view of the mode selecting assembly shown in FIG. 1.

Referring to the drawings and initially to FIGS. 1 and 2, a tape recording and/or reproducing apparatus or simply a tape recorder is provided with a plurality of mode selecting depressible push buttons including a rewind push-button 1, a stop push-button 2, a reproducing push-button 3, a fast forward push-button 4, a record push-button 5 and a pause push button 6. These push-buttons are alined on a front panel (not shown) of the tape recorder, or alternatively the front panel of the tape recorder may constitute an operating panel. The mode selecting push-buttons 1 through 6 are fixed, respectively, at the front end of slides 7 through 12 which are slidably supported on the chassis (not shown) of the tape recorder. The push buttons and slides are urged toward their indicated positions (to the left as viewed in FIG. 1) by respective coil springs 13 through 18. The rear end of each slide is bent upwardly to form bent tabs 7a through 12a, respectively, to provide a contact surface to contact a switching plate 20 (tabs 7a through 11a) while tab 12a is positioned to contact a microswitch 21 to push the actuating element of switch 21 when slide 12 is displaced to the right as viewed in FIG. 1. Switching plate 20 is rotatably supported on the chassis by a pair of pins 19 and is urged in the counter-clockwise direction as viewed in FIG. 3 by torsion springs 22 secured about pins 19. A micro-switch 23 is arranged behind switching plate 20 and is pushed to activate the switch whenever plate 20 is rotated against the urging of torsion spring 22 because of the rightward movement (as viewed in FIG. 1) of any of the slides 7 through 11.

A motor 24 suitably supported on the chassis is arranged beside micro-switch 23 and is electrically connected with switch 23. Motor 24 includes a pulley 25 fixed to the end of the output shaft of motor 24. A drive belt 26 is disposed about pulley 25 and a pulley 27 fixed to one end of a rotatably supported shaft 28. Shaft 28 is disposed above slides 7 through 12 at a right angle to these slides as viewed in FIG. 1. Fixed to shaft 28 are five pinions 29, 30, 31, 32 and 33. The pinions 29 through 33 are spaced along shaft 28 corresponding to the spacing between slides 7, 9, 10, 11 and 12. No pinion is provided to correspond with slide 8 which is associated with stop push-button 2. Five rotatable gear members 34, 35, 36, 37 and 38 are arranged under shaft 28 on a supporting shaft 39 which is disposed under and parallel to shaft 28. Gears 34, 35, 36, 37 and 38 each have a toothless portion 34a, 35a, 36a, 37a and 38a and are engageable, respectively, with pinions 29, 30, 31, 32 and 33.

Gears 34 through 38 are also provided with an integral cam surface 40 through 44, respectively, extending from one planar surface. Cam surfaces 40, 41, 42, 43 and 44 are contacted by leaf springs 45, 46, 47, 48 and 49, respectively, so that the cam surfaces extending from gears 34 through 38 are under the influence of the urging force of the corresponding leaf spring. Each cam surface is radiused and includes a segment of minimum radius extending to a segment of maximum radius and back to the segment of minimum radius. In addition, cam surfaces 40 through 44 are contacted by operating levers 50 through 54, respectively, when a corresponding one of the push-buttons 1, 3, 4, 5 or 6 is depressed. Levers 50 through 54, are all rotatably supported on a supporting shaft 55 suitably mounted on the chassis.

The forward or actuating end 50a through 54a, respectively, of each lever 50 through 54 face the lower end 56a of a rewind operating slide 56, 57a, of a reproducing operating slide 57, 58a of a fast forward operating slide 58, 59a of a recording operating slide 59 and 60a of a pause operating slide 60, respectively. Upon actuation of any of these push-buttons the corresponding operating slide is pushed upwardly. Operating levers 50 through 54 are also arranged in such a manner that the respective rear ends 50b through 54b, respectively, are engageable with a locking plate 61 which includes a locking surface 61a to engage ends 50b through 54b of the operating levers. Locking plate 61 is rotatably supported on a shaft 62 and urged clockwise, as viewed in FIG. 3, about shaft 62 by a coil spring 63. Locking plate 61 is pivoted responsive to the actuation of a plunger solenoid 64 which is linked by a rod 65 extending from the plunger element of the solenoid to locking plate 61. Thus locking plate 61 rotates counter-clockwise, as viewed in FIG. 3, against the urging force of coil spring 63 when plunger solenoid 64 is energized to engage locking surface 61a with a corresponding end 50b through 54b of the operating levers.

Five trigger levers 66 through 70, respectively, are arranged beside operating levers 50 through 54, respectively. The trigger levers are also rotatably supported on shaft 55 and include engaging portions 66a through 70a, respectively, formed at the lower ends of trigger levers 66 through 70. These engaging portions 66a through 70a are received in recesses 7b, 9b, 10b, 11b and 12b formed in slides 7, 9, 10, 11 and 12, respectively. The upper ends of trigger levers 66, 67, 68 and 70 are formed with flat end surfaces 66b, 67b, 68b and 70b, respectively. These flat end surfaces respectively engage with first stop pins 34b, 35b, 36b and 38b which extend from the planar surface of gears 34, 35, 36 and 38, respectively, near the periphery thereof. Thus when the flat end surfaces 66b, 67b, 68b and 70b contact stop pins 34b, 35b, 36b and 38b, respectively, gears 34, 35, 36 and 38 are prevented from rotating.

Figure 4:
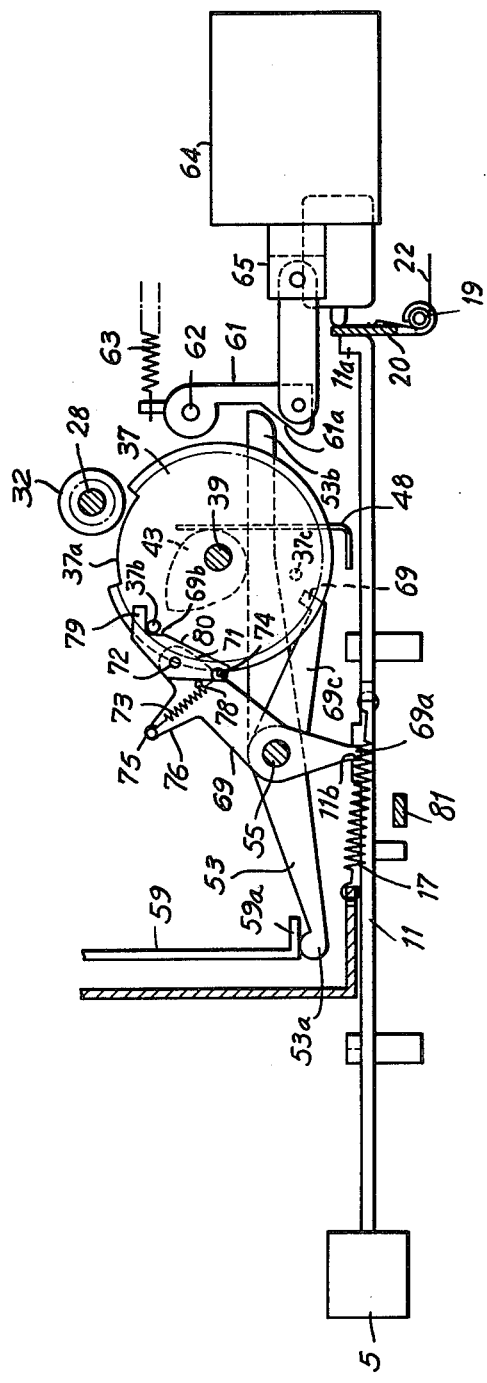
FIG. 4 is a cross sectional view taken along the line IV—IV in FIG. 1.
Figure 5:
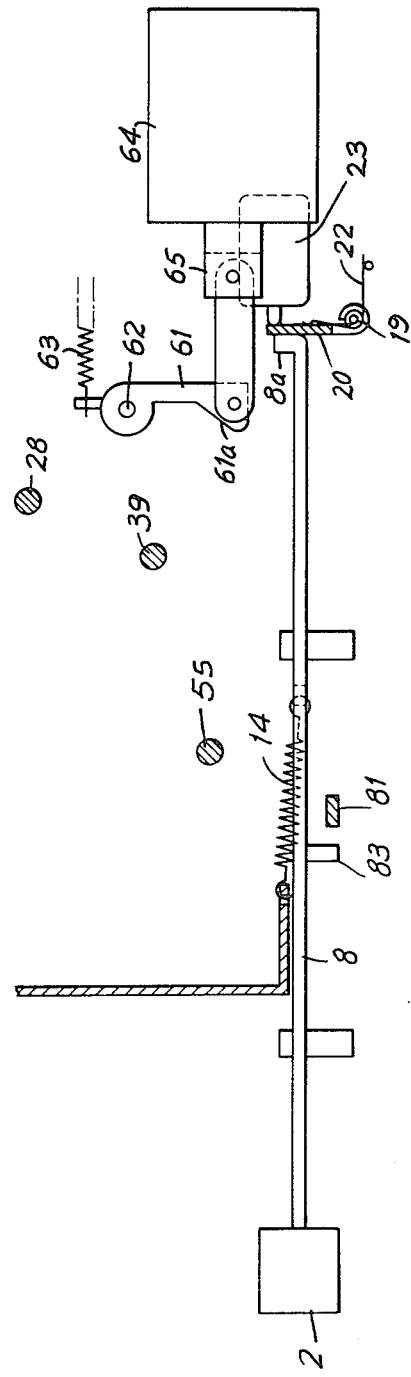
FIG. 5 is a cross sectional view taken along the line V—V in FIG. 1.

Trigger lever 69, which corresponds to record push-button 5, includes a sub-trigger lever 71 rotatably secured to its upper end by a pin 72 (see FIG. 4). A coil spring 73 is extended between a pin 74 on sub-trigger lever 71 and a pin 75 formed on an intermediate extending arm 76 of trigger lever 69 to urge sub-trigger lever 71 to rotate in the clockwise direction as viewed in FIG. 4, around pin 72. A pin 78 is provided on trigger lever 69 to limit the extent of rotation of sub-trigger lever 71. Sub-trigger lever 71 also includes a hooked end portion 79 defining a contact surface 69b which contacts a first stop pin 37b extending from gear 37 in the same manner as the first stop pins 34b, 35b, 36b, and 38b. Sub-trigger lever 71 also includes an angled surface portion 80 formed beneath contact surface 69b.

In addition, trigger levers 66 through 70 are also provided with integral arms 66c through 70c, respectively, which are disposed on the opposite sides of gears 34 through 38, respectively. The ends of arms 66c through 70c include extending hook segments 66d through 70d, respectively, which are arranged to engage respective second stop pins 34c through 38c mounted on the opposite planar surface of gears 34 through 38, respectively, at a position more radially inwardly than the first stop pins 34b through 38b and on the opposite side of the gear.

A transmitting lever 81 rotatably supported on a pin 82 mounted on the chassis is arranged under the slides 8, 9, 10 and 11. One end 81a of lever 81 is engageable with a pin 83 extending downwardly from slide 8 and the other end 81b of lever 81 is engageable with a pin 84 extending downwardly from slide 11 for a purpose which will be described more fully hereinbelow.

Next, the operation of the tape recorder which has been structurally described above will be described.

Figure 3:
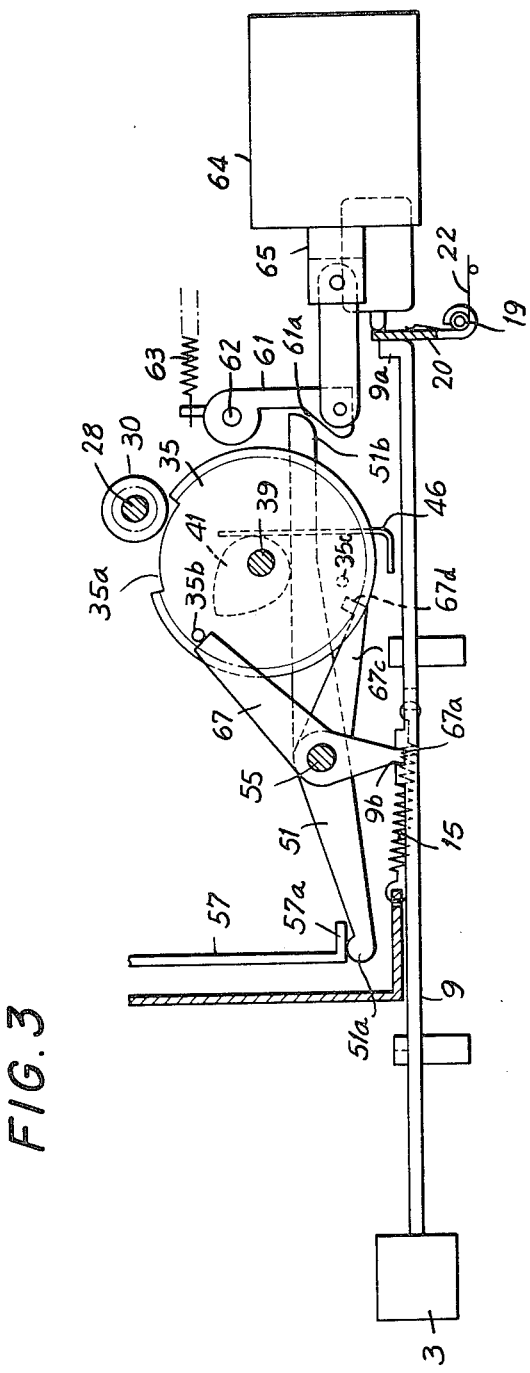
FIG. 3 is a cross sectional view taken along the line III—III in FIG. 1.

First, the operation for changing the tape recorder over from the stop mode to the reproducing mode will be described. The stop mode is shown in FIGS. 1, 3 and 4. When the reproducing push-button 3 is pushed while the recorder is in the stop mode, slide 9 displaces to the right as viewed in FIG. 6 and bent tab 9a extending upwardly from slide 9 contacts and pushes switching plate 20 rotating it clockwise, as viewed in FIG. 6, about pin 19 against the urging force of torsion spring 22. Switching plate 20 pushes the actuator of microswitch 23 actuating it to supply electric power to cause motor 24 to rotate. With the rotation of motor 24, which is coupled to shaft 28, shaft 28 is driven and pinion 30 secured to shaft 28 is also driven. Motor 24 continues to rotate for a predetermined period of time, for example about 3 minutes, as determined by a time constant circuit. Accordingly, the operator need not continue to push the recording push-button 3 while the change over operation is accomplished.

Micro-switch 23 also controls the energizing of plunger solenoid 64, because switch 23 is connected with the drive circuit of plunger-solenoid 64. Therefore, plunger-solenoid 64 is energized when reproducing push-button 3 is pushed. With activation of plunger-solenoid 64, locking plate 61 is rotated about shaft 62 against the urging force of coil spring 63. This releases the lock of operating levers 50 through 54 to clear any mode previously established in the recorder. Thus the tape recorder is automatically changed over directly to the reproducing mode from any other operating mode by pushing reproducing push-button 3. Rod 65 of plunger-solenoid 64 is pulled only momentarily and after the release of the lock on the operating levers plunger-solenoid 64 is quickly deenergized. After plunger-solenoid 64 is deenergized, locking plate 61 rotates clockwise, as viewed in FIG. 6, about pin 62 under the urging force of coil spring 63 to be in position to be able to lock operating slide 51 which is associated with the reproduce mode.

Figure 6:
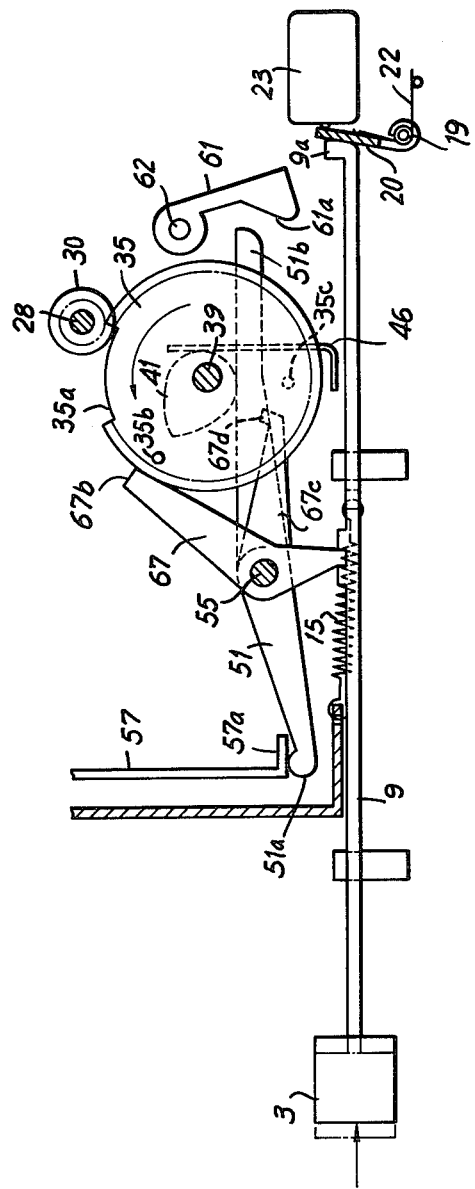
FIG. 6 is a side view of the mode selecting assembly when the reproducing push button is pushed.

With the depression of push-button 3, slide 9 moves to the right, as viewed in FIG. 6, to rotate trigger lever 67 counter-clockwise, as viewed in FIG. 6, about shaft 55 in response to the displacement of slide 9 because engaging portion 67a of trigger lever 67 is received in recess 9b of slide 9. This rotation of trigger lever 67 disengages the end surface 67b of lever 67 from the first stop pin 35b of gear 35, thereby freeing gear 35 to rotate. Leaf spring 46 in contact with cam surface 41 on the planar surface of gear 35 urges gear 35 to rotate due to the fact that leaf spring 46 moves into contact with the smallest radiused portion of cam surface 41. Therefore, cam surface 41 and gear 35 rotate counter-clockwise, as viewed in FIG. 6, due to the urging force of spring 46.

After the initial rotation of gear 35 under the urging of leaf spring 46, toothless portion 35a of gear 35 is displaced from registry with pinion 30 until the toothed portion of gear 35 engages with pinion 30, which is driven by motor 24, as described above. At this juncture gear 35 is driven by pinion 30 and rotates counter-clockwise, as viewed in FIG. 7. With this rotation cam surface 41 of gear 35 contacts and pushes operating lever 51 to rotate lever 51 clockwise, as viewed in FIG. 7, about shaft 55. As lever 51 rotates, end 51a of lever 51 contacts and pushes lower end 57a of reproducing operating slide 57 to displace slide 57 upwardly to place the tape recorder into the reproducing mode where signals recorded on the magnetic tape may be reproduced.

Figure 7:
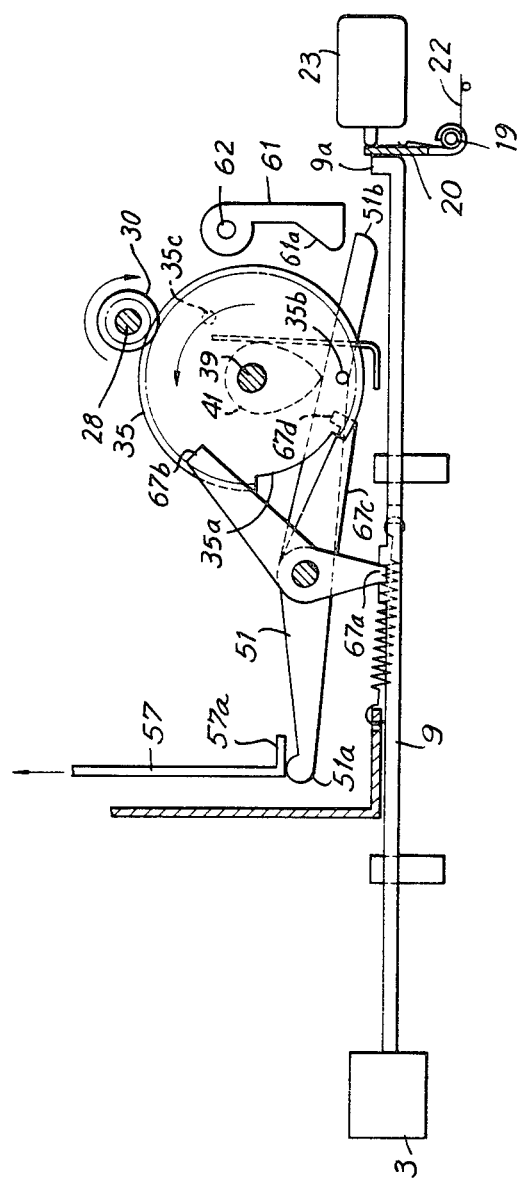
FIG. 7 is a side view of the mode selecting assembly showing the operation during change over into the reproducing mode.
Figure 8:
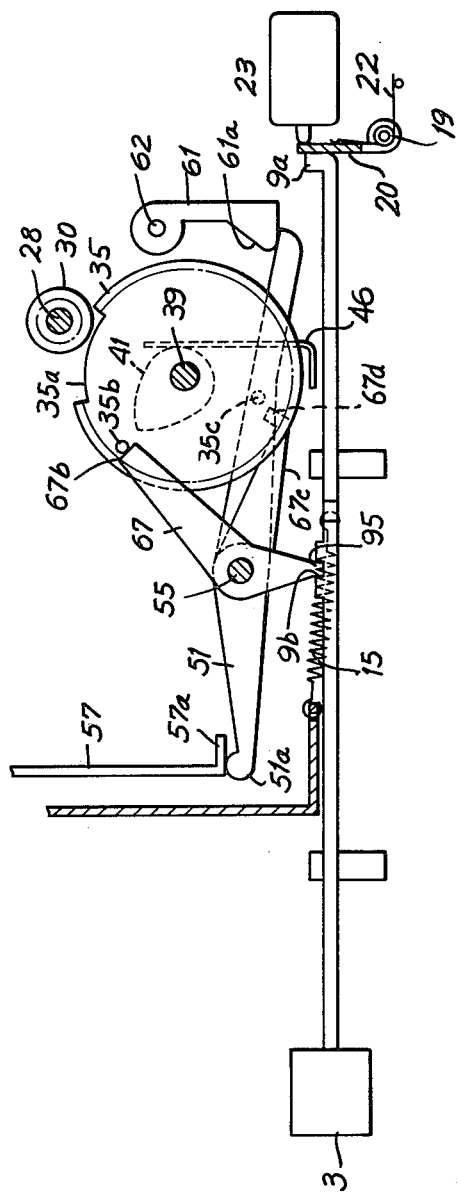
FIG. 8 is a side view of the mode selecting assembly showing when the reproducing mode is established.

During rotation of lever 51, the other end 51b of lever 51 rides down the angled surface 61a of locking plate 61 and rotates plate 61 counter-clockwise, as viewed in FIG. 7, about shaft 62 against the urging force of coil spring 63 until end 51b is free of the locking plate which returns to its unitial position due to spring 63 to lock lever 51 as shown in FIG. 8. Thus the tape recorder is maintained in the reproducing mode.

Even though lever 51 is locked, gear 35 continues to be driven by the pinion 30 through almost one revolution until toothless portion 35a of gear 35 again moves into facing position with pinion 30, whereby gear 35 is disengaged from pinion 30. However, gear 35 continues to rotate in the counterclockwise direction under the urging force of leaf spring 46 in contact with the peripheral surface of cam surface 41 until gear 35 reaches the position shown in FIG. 8. Thus, one revolution of gear 35 is established and first stop pin 35b of gear 35 is again brought into contact with flat end surface 67b of trigger lever 67 which has been restored to its original position responsive to the restoring movement of slide 9 under the urging of coil spring 15. Thus gear 35 stops rotating and is precluded from further rotation, and the operation for changing the recorder over to the reproducing mode is accomplished.

Figure 9:
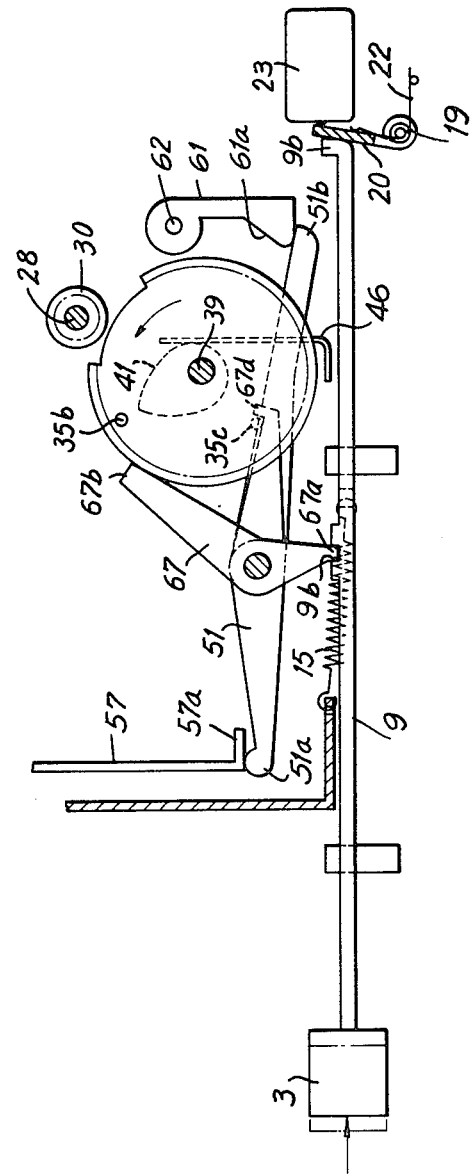
FIG. 9 is a side view of the mode selecting assembly when the reproducing push button is under continued depression after the reproducing mode has been established.
Figure 10:
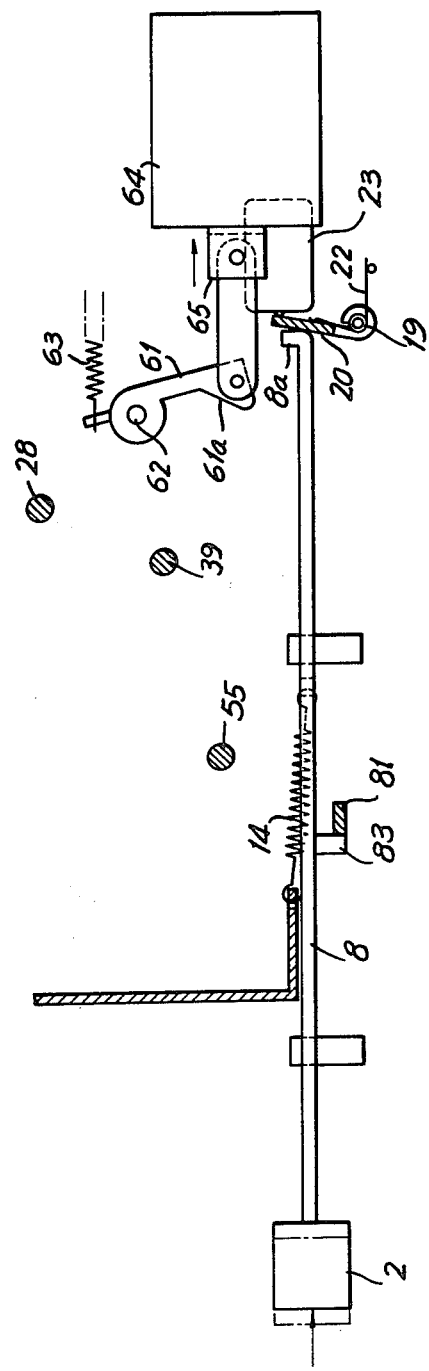
FIG. 10 is a side view of the mode selecting assembly when the tape recorder is changed over to the stop mode from the reproducing mode.

The mode change-over mechanism is designed to operate with a single light touch by the operator on a mode selecting push button. However, should the operator maintain prolonged pressure on a push-button 1, slide 9 would be maintained in its active position as shown in FIG. 9, and the actuator of switch 23 would be maintained in the depressed state because switching plate 20 would be maintained pressed against switch 22. Accordingly, motor 25 would continue to be energized and rotate and after one revolution of gear 35, gear 35 would be disengaged from pinion 30, and would further rotate under the urging force of leaf spring 46 and would then engage again with pinion 30. Whereby the gear 35 would rotate once again counter-clockwise because trigger lever 67, associated with slide 9, would be maintained in its active position where flat end surface 67b of lever 67 does not contact with first stop pin 35b extending from gear 35. The largest radiused portion of cam surface 41 provides lever 51 a stroke which is larger than the stroke to be locked by locking plate 61. Accordingly, cam surface 41 strikes operating level 51 to generate a mechanical noice as gear 35 continues to rotate further.

To rectify the above described disadvantage, gear 35 is precluded from rotating more than one revolution by the engagement of hook segment 67d on arm 67c with second stop pin 35c on gear 35, as shown in FIG. 9, because hook segment 67d of trigger lever 67 is in its active position when trigger lever 67 is maintained in its rotated position in accordance with the continued depression of reproducing push-button 3 after one revolution of gear 35 and after the recorder has been placed in the reproducing mode. Accordingly, gear 35 is locked and precluded from rotating when gear 35 has completed one revolution and the operation for changing the tape recorder over to the reproducing mode has been completed even if reproducing push-button 3 is continued to be depressed. Accordingly, cam surface 41 is precluded from striking operating lever 51 locked by locking plate 61 and the tape recorder is precluded from generating the undesirable mechanical noises.

Further, reproducing slide 57 in its active position is not mechanically effected by cam surface 41 through lever 51. In this condition, shown in FIG. 9, slide 9 is displaced to its inactive position under the urging force of coil spring 15 when the depression of reproducing push-button 3 is released. As soon as this is done, trigger lever 67 rotates clockwise, as viewed in FIG. 9, because engaging portion 67a of trigger lever 67 is engaged within recess 9b of slide 9 and rotates with the leftward movement of slide 9. Therefore, hook segment 67d of lever 67 is disengaged from second stop pin 35c of gear 35 and then flat surface 67b of trigger lever 67 again contacts first stop pin 35b of gear 35 to preclude gear 35 from further rotation as shown in FIG. 8.

Next, the operation for changing the tape recorder over from the reproducing mode to the stop mode will be described.

This operation is accomplished by the depression of stop push-button 2 while the recorder is in the reproducing mode, shown in FIG. 8. That is, slide 8 is displaced to the right, as viewed in FIG. 7, against the urging force of coil spring 14 when stop push-button 2 is depressed. With this movement tab 8a of slide 8 pushes switching plate 20 to rotate plate 20 clockwise, as viewed in FIG. 7, about pin 19 against the urging force of torsion spring 22 to contact and push the actuator of micro-switch 23. This momentarily energizes plunger-solenoid 64 pulling its rod 65 to rotate locking plate 61 counter-clockwise, as viewed in FIG. 7, about shaft 62 against the urging force of coil spring 63 thereby releasing the lock of operating lever 51. With this, reproducing slide 57 is displaced downwardly and the tape recorder is changed over to the stop mode from the reproducing mode.

Motor 24 also rotates responsive to the depression of stop bush-button 2, but stop push-button 2 does not have a corresponding pinion and gear and, hence, the rotation of motor 24 is idle in this operation.

The above described operation for changing the tape recorder over from the stop mode to the reproducing mode is the same operation as the changing over from stop mode to rewind mode, stop mode to fast forward mode and stop mode to pause mode, therefore, the detailed description of these operations will be omitted. Further, the above described operation for changing the tape recorder over from reproducing mode to stop mode is the same as the operation for changing the recorder over from rewind mode to stop mode and fast forward mode to stop mode, therefore, a detailed description of these operations will also be omitted.

Figure 11:
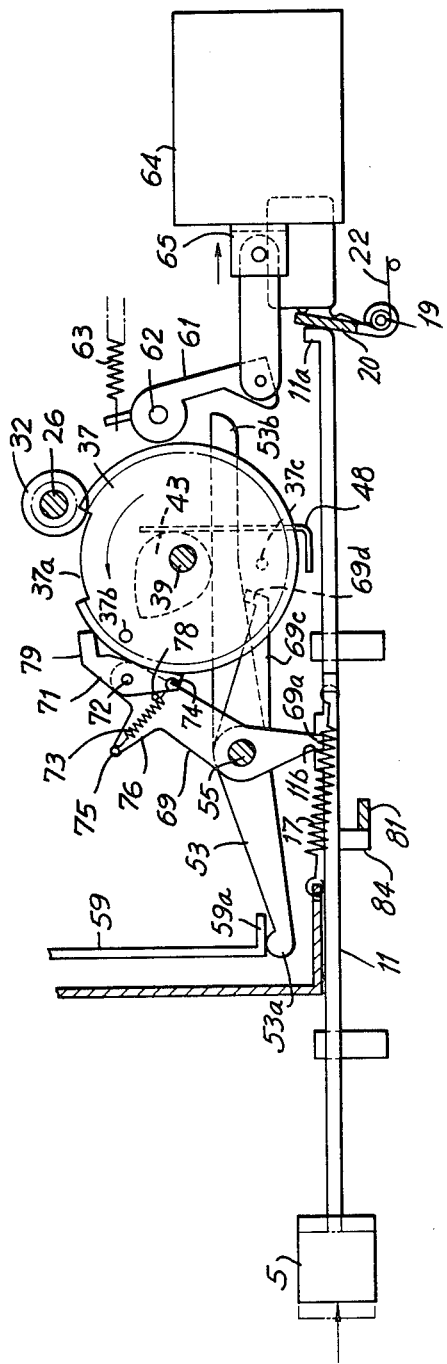
FIG. 11 is a side view of the mode selecting assembly showing the operation during change over into the recording mode.

Next, the operation for changing the tape recorder over from stop mode to record mode will be described with reference to FIG. 11.

The recording mode is established by the depression of recording push-button 5 while the recorder is in the stop mode shown in FIG. 4. That is, slide 11 is displaced to the right as viewed in FIG. 11 when recording push-button 5 is depressed. Hence, as described above micro-switch 23 is pushed by switching plate 20 and motor 24 rotates to drive pinion 32. In like manner to the operations previously described trigger lever 69 rotates counter-clockwise, as viewed in FIG. 11 about shaft 55 responsive to the displacement of slide 11. With the displacement of trigger lever 69, sub-trigger lever 71 mounted on trigger lever 69 also displaces and flat engaging portion 69b of sub-trigger lever 71 is separated from contact with first stop in 37b of gear 37. Hence, gear 37 rotates, initially due to the urging force of leaf spring 48 on cam surface 43, and then under the urging of pinion 32 driven by motor 24. Therefore, operating lever 53 is rotated by cam surface 43 on the planar surface of gear 37 and recording slide 59 is displaced upwardly, as viewed in FIG. 11. Thus, the tape recorder is changed over to the recording mode. In this operation, sub-trigger lever 71 does not rotate relative to trigger lever 69. Accordingly, the operation is the same as that for changing over from stop mode to reproducing mode.

Figure 12:
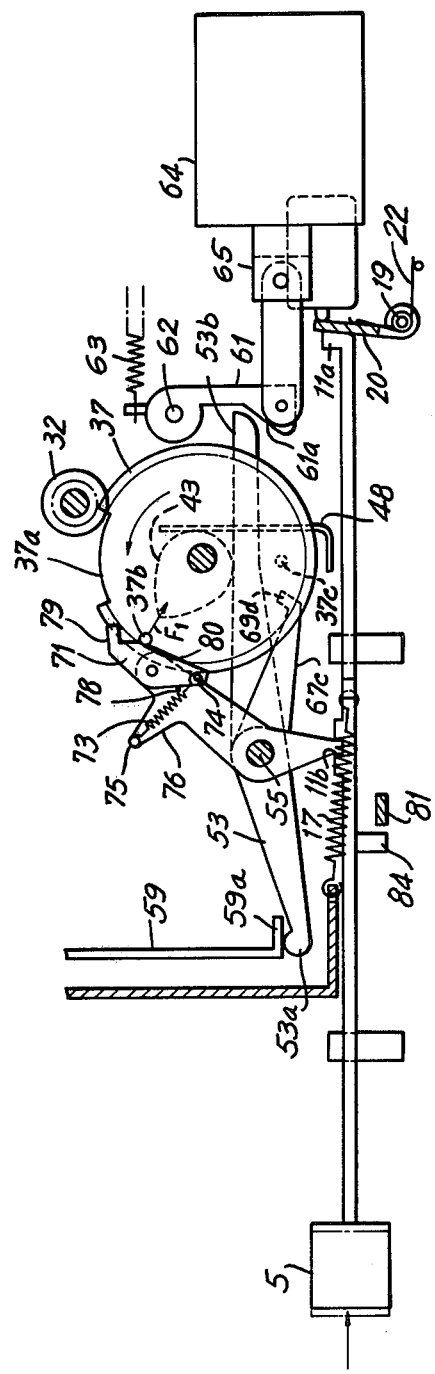
FIG. 12 is a side view of the mode selecting assembly showing an initial stage in the preparing operation for timed recording.

Next, the operation to prepare the recorder for timed recording will be described. The timed recording operation is one where the tape recorder is changed over to the recording mode automatically in accordance with a trigger signal from a timer (not shown) at some predetermined pre-set time, for example responsive to a clock like an alarm clock which can be pre-set to initiate recording automatically at any time set. With such an operation signals from a radio receiver or other signal sources operatively connected to the tape recorder are recorded on the magnetic tape while the operator is absent. The operation to prepare the recorder for timed recording is accomplished by the depression of recording push-button 5 when electric power is not supplied to the tape recorder. That is, slide 11 is displaced to the right, as viewd in FIG. 12, when recording push-button 5 is depressed. With this movement, trigger lever 69 rotates counter-clockwise, as viewed in FIG. 12, about shaft 55 and flat engaging portion 69b of sub-trigger lever 71 is separated from first stop pin 37b of gear 37. Accordingly, gear 37 rotates counter-clockwise, as viewed in FIG. 12, due to the urging force of leaf spring 48 on cam surface 43 and gear 37 is placed in engagement with pinion 32, as shown in FIG. 12, since toothless portion 37a of gear 37 has been displaced in the counter-clockwise direction. However, because no electric power is being supplied, pinion 32 associated with motor 24 is not rotating even though micro-switch 23 has been depressed responsive to the displacement of slide 11. Therefore, gear 37 stops rotating as soon as gear 37 engages pinion 32.

In this condition, first stop pin 37b on gear 37 is in contact with the angled surface portion 80 of sub-trigger lever 71 and pushes lever 71. Since coil spring 73 is relatively strong, coil spring 78 is not expanded. That is, trigger lever 69 is pushed by pin 37b through sub-trigger lever 71 and, hence, trigger lever 69 is prevented from rotating to the restoring or clockwise direction, as viewed in FIG. 12, about shaft 55. Therefore, slide 11 is prevented from being displaced to its inactive left position, as seen in FIG. 12, since slide 11 is engaged with trigger lever 69 because of the engagement of end 69a within recess 11b. Thus slide 11 is maintained in an intermediate position between its inactive position and its active position and slide 11 through switching plate 20 continues to push micro-switch 23. In addition, recording pushbutton 5 is also maintained in an intermediate position and, hence, the operator can easily confirm the establishment of the timed recording operation by observing the record pushbutton 5.

When the operation to initiate timed recording has been completed and the recorder is supplied with electric power, for example by a pre-set signal from a timer mechanism (not shown), the tape recorder is directly changed over to the recording mode because pinion 32 in engagement with gear 37 is driven by motor 24 which is activated when electric power is supplied.

Figure 13:
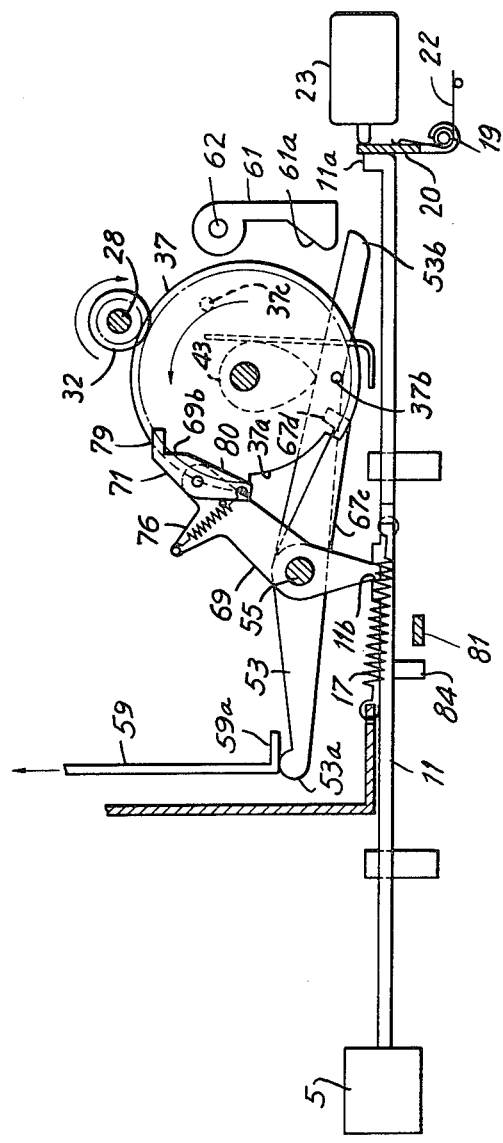
FIG. 13 is a side view of the mode selecting assembly when the tape recorder is changed over to the recording mode from the prepared mode for timed recording.

In automatically changing over to record from the preparation for timed recording, the timer (not shown) generates a signal to turn on the power switch of the tape recorder and electric power is supplied to the tape recorder. Since microswitch 23 is maintained in its closed state, motor 24 begins to rotate as soon as electric power is supplied to the tape recorder and pinion 32 driven by motor 24 is also driven. The rotation of pinion 32 is transmitted to gear 37 and gear 37 rotates as shown in FIG. 13. With rotation of gear 37, lever 53 rotates to displace recording slide 59 upwardly and lever 53 is locked by locking plate 61, in the same manner as described in the operation from stop mode to the recording mode.

When gear 37 begins to rotate, first stop pin 37b of gear 37 displaces and is separated from its engagement with angled surface 80 on sub-trigger lever 71. This frees trigger lever 69 allowing slide 11 to displace to the left, as shown in FIG. 13, under the urging force of coil spring 17 and allowing trigger lever 69 to rotate clockwise about shaft 55. After one revolution of gear 37 first stop pin 37b on gear 37 moves into contact with flat surface 69b on sub-trigger lever 71 and gear 37 is precluded from further rotation.

Next, the operation to release the preparation for timed recording shown in FIG. 12 will be described. This operation is performed by the operator, for example when he comes back to the recorder before the preset time for automatically initiating recording has occurred. This releasing operation is performed mechanically without supplying electric power to the tape recorder.

Figure 14:
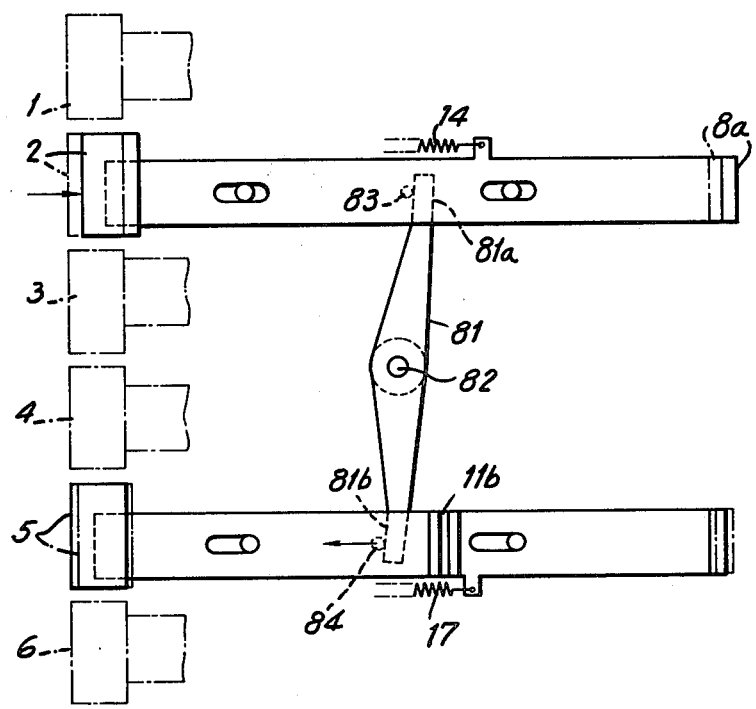
FIG. 14 is a plan view of the mode selecting assembly showing the releasing operation from the prepared mode for timed recording.

This releasing operation is accomplished merely by depressing stop push-button 2 while the recorder is set for preparation for timed recording, as shown in FIG. 12. By depressing stop push-button 2, slide 8 is displaced to the right, as viewed in FIG. 14. With this movement, pin 83 depending from slide 8 engages and pushes end 81a of transmitting lever 81 to rotate lever 81 clockwise, as viewed in FIG. 14, about pin 82. With this rotation end 81b of lever 81 engages and pushes pin 84 depending from slide 11 to displace slide 11 to its inactive position or to the left, as viewed in FIG. 14. With the movement of slide 11 to its inactive position, trigger lever 69 rotates clockwise, as viewed in FIG. 15, about shaft 55 since end 69a of trigger lever 69 is engaged within recess 11b of slide 11. As a result sub-trigger lever 71 rotates, relative to trigger lever 69, counter-clockwise, as viewed in FIG. 15, about pin 72 against the urging force of coil spring 73. The sub-trigger lever rotates because angled surface 80 of sub-trigger lever 71 is in contact with first stop pin 37b on gear 37.

It is to be noted that when the recorder is in the preparation mode for timed recording, as shown in FIG. 12, angled surface 80 of sub-trigger lever 71 is positioned to apply a force on first stop pin 37b of gear 37 in the direction indicated by the arrow $F_1$ which is in a direction approximately to the center of gear 37. Thus sub-trigger lever 71 does not generate a torque on gear 37 tending to rotate the gear. Further, gear 37 begins to rotate smoothly when electric power is supplied to the motor 24 because force $F_1$ is directed to the center of gear 37.

Figure 15:
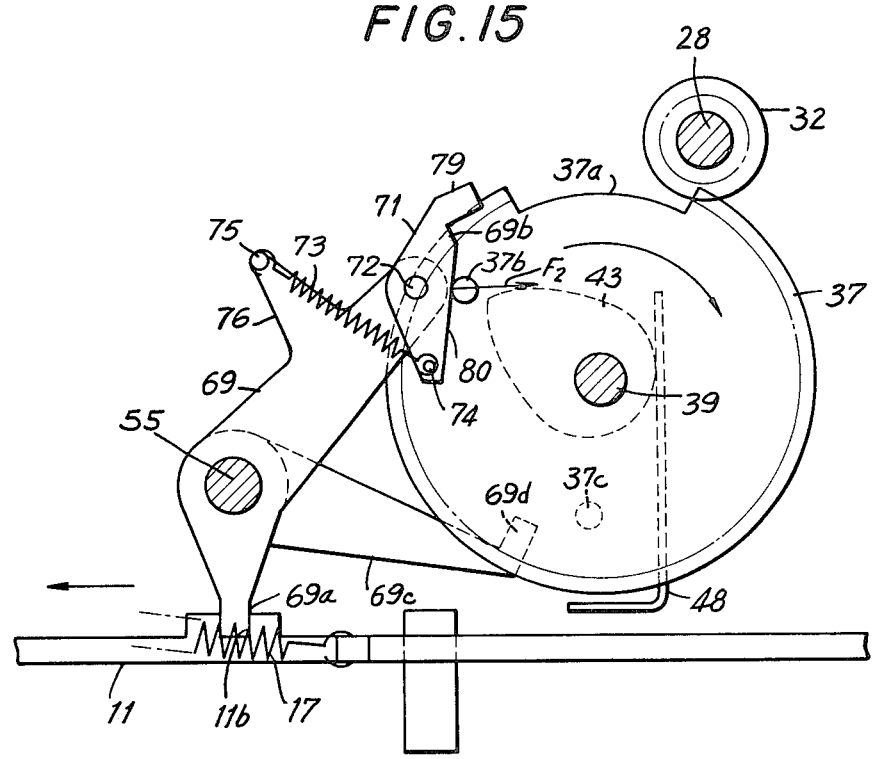
FIG. 15 is a side view of the mode selecting assembly showing the releasing operation illustrated in FIG. 14.
Figure 16:
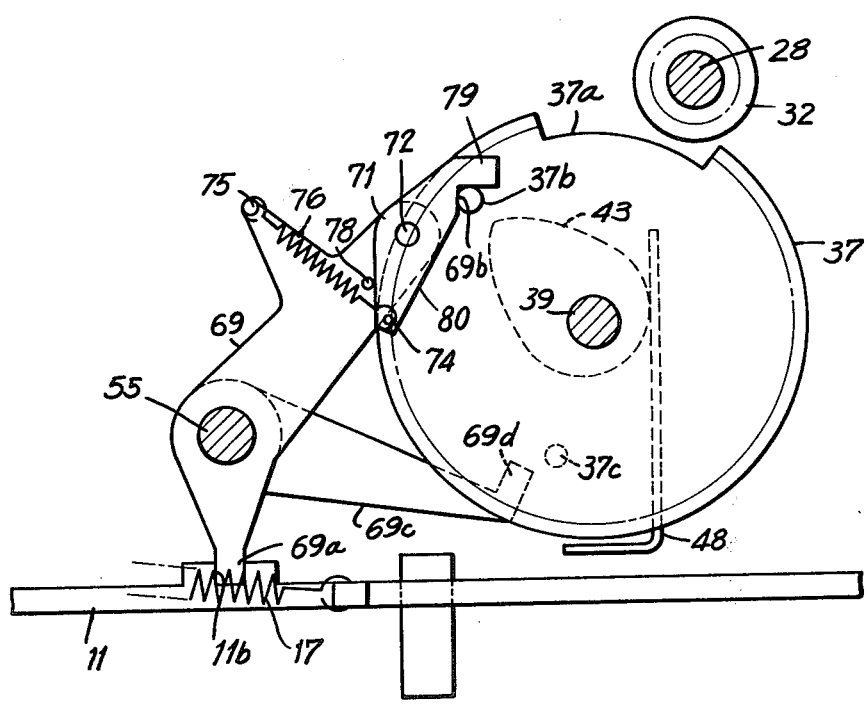
FIG. 16 is a side view of the mode selecting assembly when the releasing operation is completed.

On the other hand, when the preparation for timed recording is released, as described above, angled surface 80 of sub-trigger lever 71 is in the position shown in FIG. 15 with respect to first stop pin 37b of gear 37 and pushes gear 37 with force in the direction indicated by the arrow $F_2$. The force imparted along the direction indicated at $F_2$ generates a torque on gear 37 tending to rotate gear 37 clockwise, as viewed in FIG. 15, and, hence, gear 37 rotates clockwise a slight degree until first stop pin 37b on gear 37 is displaced from contact with angled surface 80 on sub-trigger lever 71 and moves into contacts with flat engaging surface 69b as shown in FIG. 16. This is accomplished as sub-trigger lever 71 rotates clockwise relative to trigger lever 69 about pin 72 under the urging force of coil spring 73. With this movement, first stop pin 37b on gear 37 engages flat surface 69b on subtrigger lever 71, as shown in FIG. 16, and the preparation for timed recording is released. Further, trigger lever 69 rotates clockwise, as viewed in FIG. 16, and slide 11 displaces to the left to its inactive position under the urging force of coil spring 17.

Figure 17:
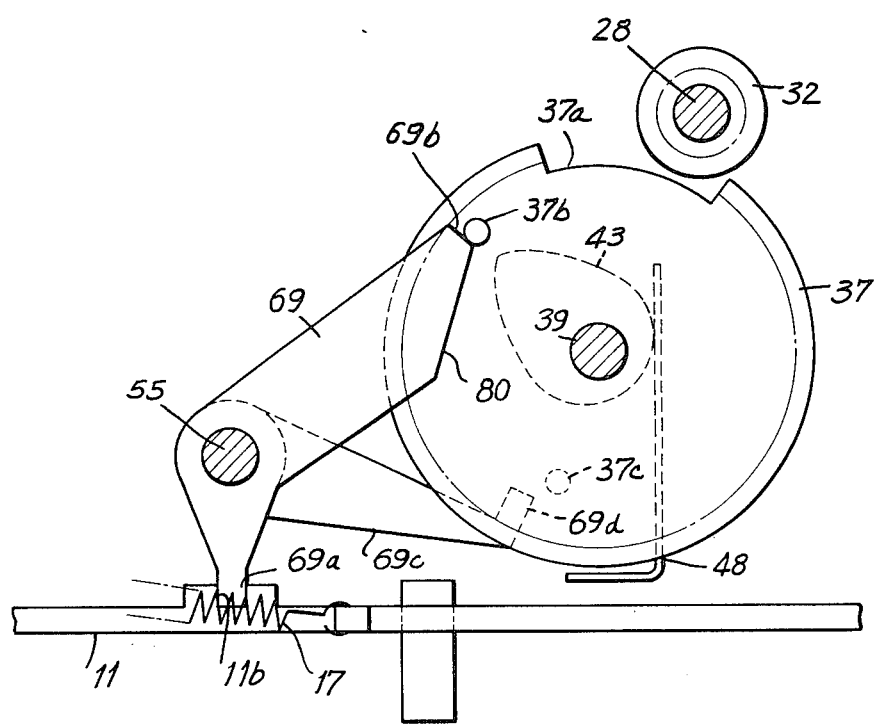
FIG. 17 is a side view of a mode selecting assembly for a tape recording and/or reproducing apparatus according to a second embodiment of this invention.
Figure 18:
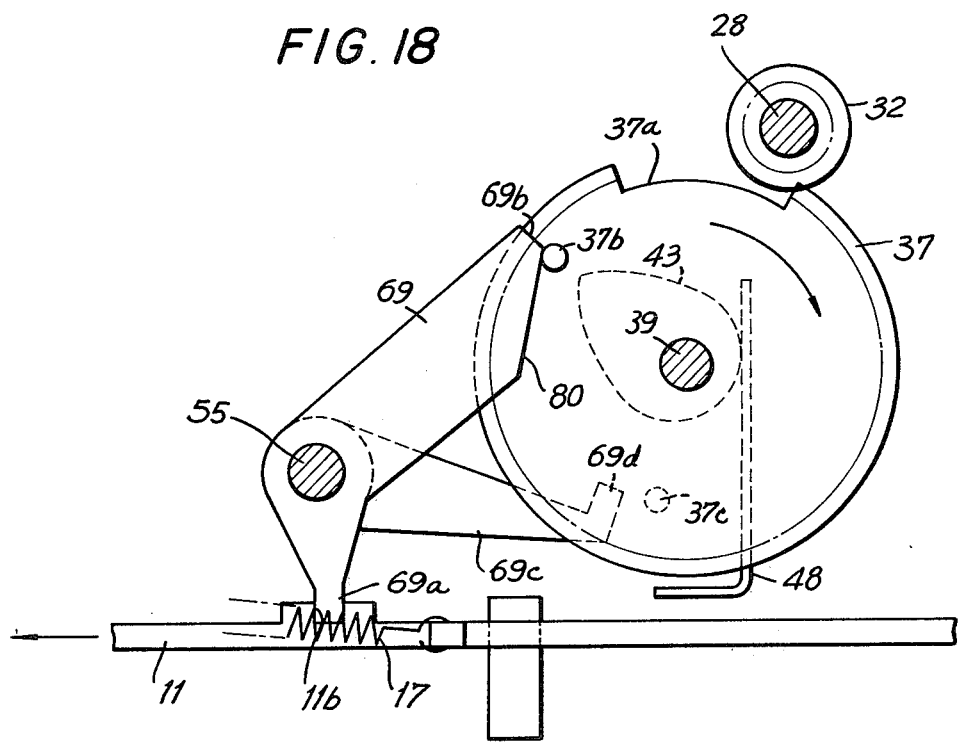
FIG. 18 is a side view of the mode selecting assembly illustrated in FIG. 17 when the prepared mode for timed recording is released.

Next, a second embodiment of this invention will be described with reference to FIGS. 17 and 18.

In the first embodiment described above, sub-trigger 71 is arranged on trigger lever 69 to establish the releasing operation from the mode of preparation for timed recording. Alternatively, in this second embodiment, flat surface 69b and angled surface 80 are formed integral with trigger lever 69 corresponding to the recording push-button 5. As seen in FIG. 17, flat engaging surface 69b contacts first stop pin 37b on gear 37 to prevent gear 37 from rotating when recording push-button 5 or its associated slide 11 are in their inactive positions. Angled surface 80 of trigger lever 69 contacts and pushes first stop pin 37b on gear 37 to rotate gear 37 clockwise about shaft 39 and to release the recorder from the prepared state for timed recording in the same manner described above. With this arrangement, the structure is somewhat simplified and the number of parts is reduced.

Although illustrative embodiments of this invention have been described in detail herein with reference to the accompanying drawings, it is to be understood that the invention is not limited to these precise embodiments, and that various changes and modifications may be made therein by those skilled in the art without departing from the scope or spirit of the invention as defined in the appended claims.

For example, this invention may be applied to other kinds of recording and/or reproducing apparatus, for example, video tape recorders.

Moreover, the mode selecting assembly may be driven by a motor which also drives a capstan, although in the preferred embodiment the mode selecting assembly is driven by a separate motor.

In addition, operating levers 50, 51, 52, 53 and 54 and trigger levers 66, 67, 68, 69 and 70 may be supported by a singular shaft in the above described preferred embodiment.

Also, locking plate 61 may be directly pushed by slide 8 associated with stop push-button 2. Alternatively, locking plate 61 may be rotated by a pinion and a gear provided with a toothless portion and a cam which are arranged to correspond with stop push-button 2 and slide 8.

What is claimed is:

1. A mode selecting assembly for a recording and/or reproducing apparatus wherein signals are recorded on a recording media and/or reproduced from a recording media comprising:
    at least one mode selecting push-button associated with a selected operating mode for said apparatus, said push-button being depressible from a first inactive position to a second active position to initiate selection of an operating mode for said apparatus;

an operating member associated with each said push-button for effecting a change over from one mode for said apparatus to another mode responsive to the displacement of said operating member from a first inactive position to a second active position initiated by the depression of said at least one push-button;

an operating gear member associated with each said operating member, said operating gear member including a toothless portion along a limited circumferential extent of said gear member, said gear member being operatively interconnected with said associate operating member to effect displacement of the latter from its first position to its second position upon rotation of said operating gear member;

pinion associated with each said operating gear member disposed to engage said operating gear member to drive the latter when said associated pinion is in engagement with the toothed portion of said operating gear member and wherein said pinion is disengaged from said operating gear member when said toothless portion of the latter moves into registry with said pinion;

trigger means operatively associated with each said mode selecting push-button and movable from a first inactive position to a second active position to initiate engagement of said toothed portion of the operating gear member with said pinion in response to the depression of said push-button whereby said operating gear member is driven by said pinion through the toothed portion of each rotary cycle of said operating gear member to thus establish a selected operating mode for said apparatus; and stop means associated with each said operating gear member for preventing further rotation of said operating gear member after the latter has completed said cycle and said selected operating mode has been established, whereby said operating gear member is prevented from rotating beyond one rotary cycle and reengaging said pinion if said associated push button is held down in said second position.

2. A mode selecting assembly according to claim 1 including first stop means formed on each said operating gear member cooperable with said trigger means when said trigger means is in its said first inactive position to lock said operating gear member to preclude rotation thereof.

3. A mode selecting assembly according to claim 2, wherein each said trigger means comprises a trigger lever rotatably supported within said apparatus having one end formed of a flat contacting surface and wherein said first stop means comrises a first pin extending from the planar surface of said operating gear member which is engageable with said flat contacting surface of said trigger lever when said trigger lever is in its said first inactive position to preclude rotation of said operating gear member.

4. A mode selecting assembly according to claim 3, wherein said means for preventing said operating gear member from further rotation comprises an integral arm formed on said trigger lever and second stop means formed on said operating gear member cooperable with said integral arm formed on said trigger lever after said operating gear member has completed one revolution to lock said operating gear member to preclude further rotation thereof.

5. A mode selecting assembly according to claim 4, wherein said integral arm formed on said trigger lever includes a hook segment to an end thereof and said second stop means comprises a second pin extending from the planar surface of said operating gear member which is engageable with said hook segment after said operating gear member has completed one revolution to preclude further rotation thereof.

6. A mode selecting assembly according to claim 1, further including an integrally formed cam surface on the planar surface of each said operating gear member, said cam surface having a segment with a minimum radius extending to a segment of maximum radius, a leaf spring member in contact with the peripheral surface of each said cam surface, said cam surface being oriented such that when said toothless portion of said operating gear member is in registry with said pinion member said leaf spring is in contact with the segment of said cam surface of maximum radius whereby said leaf spring urges said cam surface and operating gear member to rotate to engage said pinion member with the toothed portion of said operating gear member when said trigger means is activated responsive to the depression of said push-button.

7. A mode selecting assembly according to claim 6 including an operating lever pivotally mounted in said apparatus and having an intermediate segment thereof disposed to be in contact with the peripheral surface of each said cam surface and having one end in contact with said operating member whereby said cam surface pivots said operating lever from a first inactive position to a second active position responsive to rotation of said cam surface with the rotation of said operating gear member to displace said operating member from its said first inactive position to its said second active position.

8. A mode selecting assembly according to claim 7 further comprising a depressible stop push-button adapted to change said apparatus from an operating mode into a stop mode upon depression of said stop push-button, a locking plate pivotally mounted in said apparatus for locking said operating lever in its said second active position thereby to maintain said operating member in its said second active position, a plunger solenoid operatively associated with said locking plate to pivot said locking plate from a first position wherein said locking plate is in locking engagement with said operating lever to a second position away from locking engagement with said operating lever, said plunger-solenoid being operatively associated with said stop push-button whereby depression of said stop push-button energizes said plunger-solenoid to release the locking engagement of said locking plate and said operating lever.

9. A mode selecting assembly according to claim 8, including a plurality of operating push-buttons including, at least, a record push-button, a reproduce push-button and a rewind push-button, said mode selecting assembly further including a switch plate pivotally mounted in said apparatus operatively associated with each of said operating push-buttons and pivotable from a first inactive position to a second active position upon the selected depression of any of said operating push-buttons, a switch operatively associated with said switch plate, said switch being activated upon movement of said switch plate from its said first inactive position to its said second active position, said switch controlling the energization of said plunger-solenoid.

10. A mode selecting assembly according to claim 9, wherein said pinion is driven by a motor controlled by said switch adapted to supply electric power to said motor for a period of time sufficient to accomplish a mode selecting operation.

11. A mode selecting assembly according to claim 10 wherein said trigger means comprises a rotatably supported trigger lever having one end received in a recess formed in a reciprocating slide associated with said operating push-button, and including a first stop pin mounted on a planar surface of said operating gear, said first stop pin being contactable with a flattened end surface of said trigger lever thereby to prevent said operating gear from rotating when engaged therewith, and said means for preventing said operating gear member from further rotation comprises an integral arm formed on said trigger lever, a hook segment formed at the end of said integral arm, and a second stop pin extending from the planar surface of said operating gear member engageable with said hook segment after said operating gear member has completed one revolution to preclude further rotation thereof after the establishment of the selected operating mode when said operating push-button is continued to be depressed.

12. A mode selecting assembly according to claim 11, in which said pinion includes a plurality of pinions each associated with a respective mode and arranged to engage a respective operating gear member, and further comprising means to maintain the pinion associated with the record mode in engagement with the respective operating gear member in an actuated condition to place said apparatus in condition to change over to the record mode.

13. A mode selecting assembly according to claim 12, wherein said means to maintain said record mode pinion in engagement with said record mode operating gear member comprises a sub-trigger lever having an angled surface portion rotatably supported on said trigger lever associated with said record mode, said angled surface portion being engageable with said first stop pin on said record mode operating gear member to maintain said record mode trigger lever in an actuated position.

14. A mode selecting assembly according to claim 13, wherein said sub-trigger lever is rotatably supported on said record mode trigger lever and is urged to rotate by a spring member in a direction that said angled surface portion on said sub-trigger lever pushes against said first stop pin on said record mode operating gear member and wherein said sub-trigger lever is prevented from rotating in said direction by a pin extending from said record mode trigger lever and wherein said angled surface portion imparts a force directed substantially toward the center of said record mode operating gear member through said first stop pin.

15. A mode selecting assembly according to claim 12, wherein said means to maintain said record mode pinion in engagement with said record mode operating gear member comprises an angled surface portion formed on said trigger lever associated with said record mode, said angled surface portion being engageable with said first stop pin to maintain said record mode trigger lever in an actuated position.

16. A mode selecting assembly according to claim 12, further comprising means for releasing said record mode pinion from said record mode operating gear member, by rotating said record mode operating gear to its original inactive position whereby the toothless portion of said record mode operating gear is in registry with said record mode pinion and said operating gear is disengaged from said pinion.

17. A mode selecting assembly according to claim 16, wherein said releasing means comprises a transmitting lever which is operatively associated with said stop mode operating push-button, whereby said record mode operating push-button is restored to its inactive position in accordance with the depression of said stop mode operating push-button and the displacement of said stop mode operating push-button in transmitted to said record mode operating gear member through said record mode trigger lever.

18. A mode selecting assembly according to claim 17, including a pivotally mounted transmitting lever having one end of said transmitting lever in engagement with a slide member associated with said recording push-button, and its other end in engagement with a slide member associated with said stop push-button whereby movement of said stop push-button moves said slide associated with said stop push-button to pivot said transmitting lever to move said slide associated with said record push-button.

* * * * *